United States Patent Office 2,780,629
Patented Feb. 5, 1957

2,780,629

(CHLOROBENZYLIDENEDIIMINO)-BIS-THIAZOLES

Kenneth C. Kauer, Midland, Mich., assignor to The Dow Chemical Company, Midland, Mich., a corporation of Delaware No Drawing. Application May 4, 1956,
Serial No. 582,641

3 Claims. (Cl. 260—306.8)

This invention is concerned with chlorobenzylidenediimino-bis-thiazoles having the formula

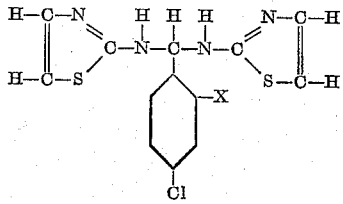

In this and succeeding formulae, X represents chlorine or hydrogen. The new compounds are crystalline solids, somewhat soluble in certain organic solvents such as acetone and of low solubility in alcohols, hydrocarbons and water. These compounds have been found useful as anti-microbial agents and particularly as active toxicants for the control of bacteria such as *Staphylococcus aureus* and fungi such as *Rhizopus nigricans*.

The compounds of the invention may be prepared by reacting 2-aminothiazole with a chlorobenzaldehyde of the formula

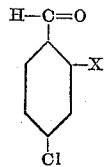

The reaction proceeds readily when the reactants are contacted at temperatures of from about 50° to 90° C. Good results are obtained when employing two moles of the 2-aminothiazoles per mole of chlorobenzaldehyde in the reaction.

In carrying out the reaction, the 2-aminothiazole and chlorobenzaldehyde compound are mixed together and heated to a reaction temperature. In practice it is generally convenient to contact the reactants in a solvent such as absolute methanol or absolute ethanol and to carry out the reaction at the boiling point of the solvent and under reflux. On completion of the reaction, the reaction mixture is cooled to about 25° C. to precipitate the product. The latter may be separated and purified by conventional procedures such as filtration and washing with solvent.

The following examples illustrate the invention but are not to be construed as limiting the same.

*Example 1.—2,2'-(4-chlorobenzylidenediimino) bis-thiazole*

75 grams (0.75 mole) of 2-aminothiazole and 53 grams (0.375 mole) of 4-chlorobenzaldehyde were dispersed in 150 milliliters of absolute alcohol and the mixture heated to 80° C. with stirring. Thereafter the mixture was cooled to room temperature and allowed to stand for several hours. During the above operations, a yellow solid precipitated and on completion of the reaction the mixture had become a viscous yellow paste. To the latter, 50 milliliters of absolute alcohol was added and the mixture filtered to separate the desired 2,2'-(4-chlorobenzylidenediimino)-bis-thiazole product as a tan powder melting at 126°–128° C.

*Example 2.—2,2'-(2,4-dichlorobenzylidenediimino)-bis-thiazole*

60 grams (0.6 mole) of 2-aminothiazole and 52.5 grams (0.3 mole) of 2,4-dichlorobenzaldehyde were dissolved in 200 milliliters of absolute ethyl alcohol with heating and stirring. The resulting mixture was heated at gradually increasing temperatures to about 80° C. with continuous agitation. Thereafter the mixture was cooled and allowed to stand at room temperature for about 1.5 hours. During the above operations a yellow solid precipitated from the reaction mixture. The solid was separated by filtration and dried to obtain a 2,2'-(2,4-dichlorobenzylidenediimino)-bis-thiazole product as a yellow powder melting at 115°–117° C. Infra-red absorption spectra of the product confirmed the assigned structure.

The compounds of Examples 1 and 2 were separately dispersed in nutrient agar media to prepare nutrient media saturated with respect to the said compounds. Portions of each nutrient medium were streaked with actively growing broth cultures of *Staphylococcus aureus* and the inoculated media incubated at 35° C. for a period of 72 hours. Further portions of each nutrient medium were streaked with active spore suspensions of *Rhizopus nigricans* and the media incubated at 30° C. for 72 hours. After incubation the above inoculated media were found to be free of growth of the respective organisms, while similarly inoculated and incubated portions of the basal nutrient media without admixture of one of the bis-thiazole compounds were found to support vigorous growth of the test organisms.

I claim:

1. 2,2'-(chlorobenzylidenediimino)-bis-thiazoles having the formula:

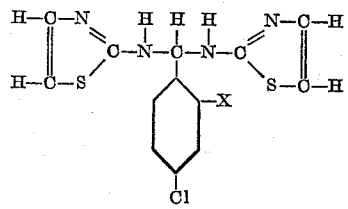

wherein X represents a member of the group consisting of chlorine and hydrogen.

2. 2,2'-(4-chlorobenzylidenediimino)-bis-thiazole.
3. 2,2'-(2,4-dichlorobenzylidenediimino)-bis - thiazole.

No references cited.